United States Patent
Faraghan

[15] 3,673,880
[45] July 4, 1972

[54] VARIABLE SPEED DRIVE

[72] Inventor: Joseph T. Faraghan, 600 Arthur Street, Philadelphia, Pa. 19111

[22] Filed: Jan. 6, 1971

[21] Appl. No.: 104,361

[52] U.S. Cl. ............................................................. 74/197
[51] Int. Cl. ............................................................. F16h 15/08
[58] Field of Search ................................... 74/197, 196, 194

[56] References Cited

UNITED STATES PATENTS

| | | | |
|---|---|---|---|
| 3,473,622 | 10/1969 | Orr | 74/197 X |
| 3,270,576 | 9/1966 | Goldwasser | 74/216 X |

Primary Examiner—Leonard H. Gerin
Attorney—Paul & Paul

[57] ABSTRACT

A variable speed drive has a driving wheel and a driven wheel disposed at right angles to each other, with the circumferential edge of one of the wheels engaging the side surface of the other wheel. Either wheel may function as the driving wheel; the other then functions as the driven wheel. To change the speed and/or direction of rotation, the position of one of the wheels is changed relative to the other, without disturbing the right-angle relationship, by moving the axis of rotation of one of the wheels along the diametral plane of the other wheel. The circumferential edge of said one wheel is provided with a series of spaced-apart circular discs portions of which protrude radially from the circumferential edge of the wheel. Each of the discs is mounted for rotation on its own axis, the axis of rotation being tangential, or substantially tangential, to the wheel. The projecting discs engage, or are engaged by, the side surface of the other wheel. When the speed and/or direction of rotation is to be changed by changing the relative positions of the two wheels, the projecting discs which are in engagement with the side surface of the other wheel merely roll on the side surface.

2 Claims, 4 Drawing Figures

PATENTED JUL 4 1972  3,673,880

INVENTOR.
Joseph T. Faraghan
BY
Paul & Paul
ATTORNEYS.

VARIABLE SPEED DRIVE

BACKGROUND OF THE INVENTION

Variable speed drives are known wherein the driving and driven wheels are disposed at right angles to each other with the circumferential edge of one wheel in frictional engagement with the side surface of the other. In such variable speed drives, the speed and/or direction of rotation are changed by moving the position of one wheel relative to the other along the diameter thereof. When this is done in prior art devices, unless the two wheels are disengaged from each other, the peripheral edge of the one wheel is dragged across the side face of the other, with considerable frictional resistance being developed, and with resultant wear on the wheels.

SUMMARY OF THE INVENTION

A principal object of the present invention is to provide a variable speed drive of the type referred to above but in which the speed and/or direction of rotation may be changed without disengaging the two wheels and without dragging the circumferential edge of the one wheel across the side surface of the other.

A more specific object is to provide a variable speed drive of the foregoing type in which, when the speed and/or direction of rotation is to be changed, the peripheral edge of the one wheel is moved across the flat face of the other wheel by a rolling engagement, rather than a frictional or dragging engagement, thereby to avoid wear and tear.

These and other objects are accomplished by providing around a circumferential edge of the one wheel which is adapted to engage the side surface of the other, a series of spaced-apart circular discs, radially disposed. A portion of each disc projects radially beyond the periphery of the wheel on which it is mounted. Each of the discs is mounted to be rotatable on its own axis, each axis of rotation being tangential, or substantially tangential, to the supporting wheel. As the wheel rotates, the projecting discs engage the side surface of the other wheel, and either drive the other wheel or are driven by the other wheel, according to which of the two wheels is employed as the driving wheel. As previously indicated, either of the two wheels may function as the driving wheel, the other then functioning as the driven wheel.

When the relative positions of the two wheels is to be changed to change the speed and/or direction of rotation of the drive, the projecting discs which are in engagement with the side surface of the one wheel merely roll on the side surface thereof. There is no frictional drag during the change in speed, and the wear on the wheels is substantially reduced.

DETAILED DESCRIPTION OF THE PREFERRED EMBODIMENTS

Figure 1:
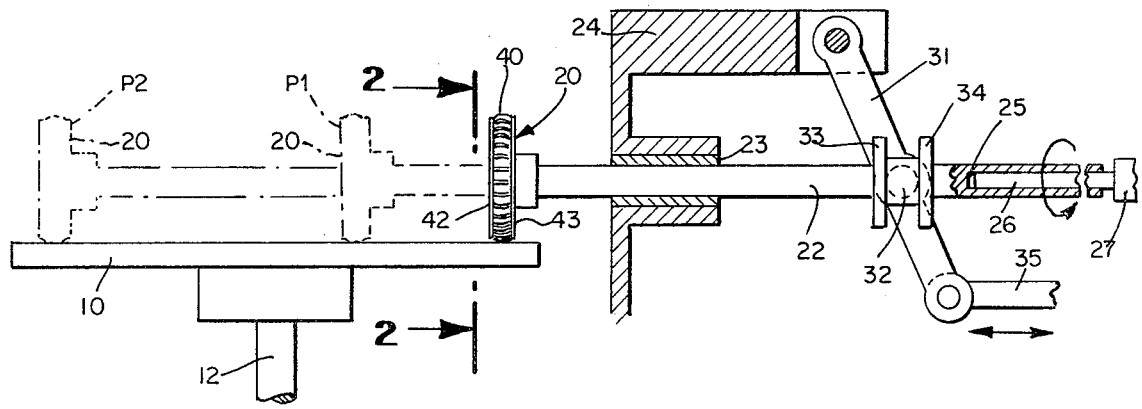
FIG. 1 is a top view, partly in section, of a simplified construction embodying the present invention.

FIG. 1 is a plan view showing a first wheel 10 and a second wheel 20 mounted at right angles relative to each other. Wheel 10 is mounted on a horizontal shaft 12, and wheel 20 is mounted on a shaft 22 which is also horizontally disposed but which extends at right angles to shaft 12. Each of the wheels 10 and 20 are secured to their respective shafts, as by keys.

So far as the present invention is concerned, any suitable mechanism may be provided for changing the relative positions of wheels 10 and 20. In FIG. 1, the position of wheel 20 is indicated as being movable to the positions P1 and P2 shown in phantom, and simplified means for accomplishing such movement are illustrated. It is to be understood, however, that the particular means shown for mounting wheel 20 and for changing its position relative to wheel 10 are merely illustrative and that other means could be employed for this purpose.

In FIG. 1, shaft 22 is shown supported in a bearing 23 in a frame 24. The right end of shaft 22 is provided with a bore 25 of square cross section which receive a projection 26 of corresponding square cross section which extends forwardly from a shaft 27 which is supported for rotation in a frame member, not shown.

Pivotally supported in frame 24 are a pair of lever arms 31, one on each side of shaft 22, only one being visible in FIG. 1. Each of the arms 31 is provided with a pin 32 which project inwardly toward the shaft 22 and are received in slots formed on each side of shaft 22 by a pair of spaced-part vertical members 33 and 34 which are fixed on shaft 22 and extend outwardly to either side thereof.

To move the wheel 20 from the position shown in solid lines in FIG. 1 to the positions shown in phantom, a link 35 is pushed forwardly (to the left as viewed in FIG. 1) thereby swinging the arms 31 forwardly in an arcuate manner. The pins 32 press against the member 33 and cause the shaft 22 to move to the left, as viewed in FIG. 1. Since the movement of levers 31 is arcuate, the pins 32 move slightly downwardly in the slots between the members 33 and 34. When the shaft 22 is moved to the left as just described, the projection 26 on the shaft 27 slides in the bore 25 and is partially withdrawn therefrom.

As previously indicated, either of the wheels 10 and 20 may be the driving wheel, the other then being the driven wheel. Let us assume, for purposes of this description, that wheel 20 is the driving wheel. It will be seen that as the position of the wheel 20 is moved radially inwardly toward the center axis of wheel 10, with the axis of rotation of wheel 20 moving in the plane of the diameter of wheel 10, that the speed at which the wheel 10 is driven will be increased. Thus, the speed at which wheel 10 and shaft 12 are driven is greater when drive wheel 20 is in phantom position P1 than when it is in the position shown in solid lines.

If the drive wheel 20 is moved beyond the center axis of the driven wheel 10, the direction of rotation of the driven wheel 10 is changed. Thus, when the drive wheel 20 is in the phantom position P2, the wheel 10 is driven at the same speed as when the wheel 20 is in the position shown in solid lines, but in the opposite direction. It will be understood that the illustration in FIG. 1 is simplified, and that, as there shown, the lever arms 31 would be too short to achieve movement of the wheel 20 from the position shown in solid lines to phantom position P2. This could be readily achieved, however, by increasing the lengths of the lever arms, etc.

What has been said so far is known in the art. The present invention resides in the construction of the circumferential edge of the wheel 20. In prior art mechanisms, the circumferential edge of the wheel 20 frictionally engages the flat side surface of the wheel 10. Thus, when the position of the wheel 20 is changed relative to the wheel 10, the circumferential edge of the wheel 20 is dragged frictionally across the side surface of the wheel 10, unless, of course, the two wheels are disengaged before changing their relative positions.

In accordance with the present invention, the circumferential edge of wheel 20 is provided with means which allow the circumferential edge of wheel 20 to be rolled across the flat side surface of the wheel 10. The side surface of wheel 10 may preferably be hard rubber or hard neoprene.

In the embodiment illustrated in the drawings, the circumferential edge of the wheel 20 is provided with a series of circular discs, preferably steel, each lying in a radial plane of wheel 20, and each having a portion projecting beyond the peripheral edge of the wheel 20. The peripheral edges of the discs 40 are preferably half wound.

To receive the circular discs 40, the peripheral region of the wheel 20 is provided with a series of radial slots 41 each having a width corresponding to, but slightly greater than, the thickness of the discs 40, and each having a depth corresponding to approximately two-thirds to three-quarters of the diameter of the discs 40. Into these slots 41, the circular discs 40 are placed.

To prevent the discs 40 from dropping out of the slots 41, while nevertheless allowing the discs to move rotationally about their own axis, annular retaining bands 42 and 43 are placed on opposite surfaces of the wheel 20 and secured thereto as by bolts 44 which pass through the body 21 of the wheel between the slots 41. The inward surface of each of the retaining bands 42 and 43 is curved, as at 42a and 43a, in a manner corresponding to the curvature of the discs 40. The distance between the edge surfaces 42a and 43a is less than the diameter of the discs 40 and thus the discs 40 are captive in the slots 41.

Figure 2:
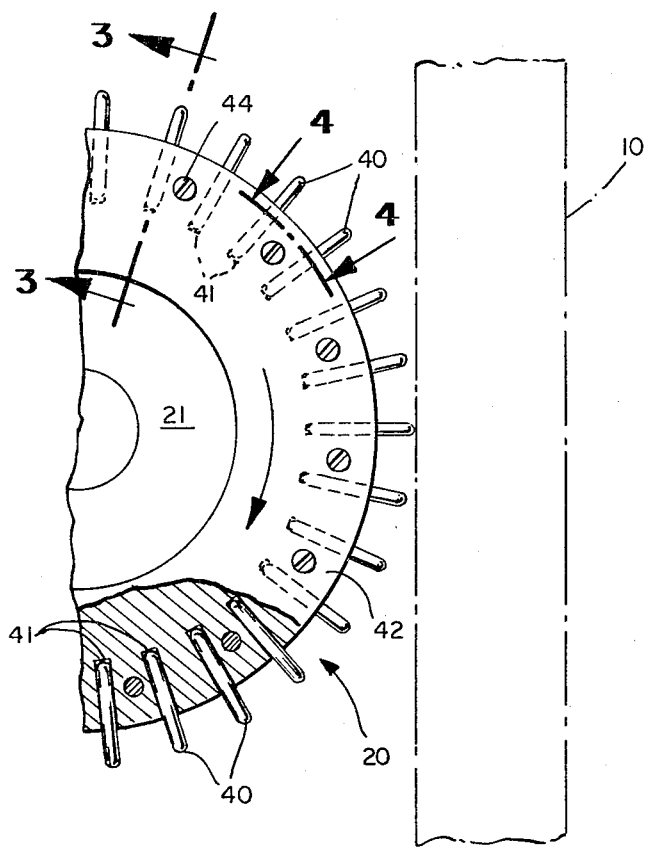
FIG. 2 is an elevational view looking along the line 2—2 of FIG. 1.
Figure 3:
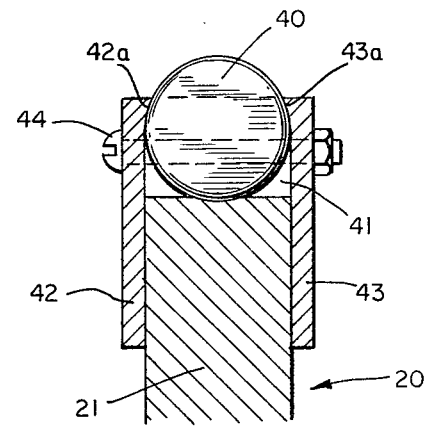
FIG. 3 is a view looking along the line 3—3 of FIG. 2.
Figure 4:
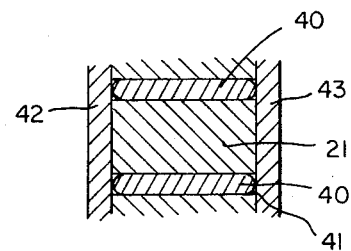
FIG. 4 is a view looking along the line 4—4 of FIG. 2.

It will be seen from FIGS. 1 and 2, that when wheel 20 is driven rotationally, by drive means not shown connected to shaft 27, the projecting discs 40 engage successively the side face of the wheel 10 and cause wheel 10 to move rotationally at a speed which is related to the distance from the center axis of rotation of the wheel 10 to the point of contact of the discs 40 with the side surface of the wheel 10. When wheel 20 is the driving wheel, the greater the distance from the center axis of rotation of wheel 10 to the point of contact by the discs 40, the slower the speed at which the wheel 10 is rotated. If, on the other hand, the wheel 10 is the driving wheel and wheel 20 is the driven wheel, then the speed of the driven wheel 20 increases as the distance from the center axis of the drive wheel 10 increases.

The particular means shown and described for mounting the rotatable steel discs 40 about the circumferential edge of the wheel 20 is a presently preferred means. However, it is to be understood that it is within the spirit and concept of the present invention to use other means for mounting the discs at the circumferential edge of the wheel for rotation about their individual axes.

With the construction shown and described, when the position of the wheel 20 is changed relative to that of the wheel 10, the particular disc or discs 40 which are then engaging the side surface of drive wheel 10 rotate about their own axis, thereby avoiding the frictional drag and frictional resistance which has characterized prior art variable speed drives of this type.

What is claimed is:
1. A variable speed drive comprising:
   a. a disc-like drive wheel;
   b. a disc-like driven wheel;
   c. means mounting said drive and driven wheels for rotation on axes disposed at right angles to each other and in such position that the circumferential edge of one wheel faces the side surface of the other;
   d. a plurality of radial slots at the periphery of said one wheel;
   e. a circular axle-less disc in each slot;
   f. each slot having a depth greater than one-half but less than the full diameter of said circular disc, whereby a portion of each of said discs projects beyond the periphery of said one wheel and is adapted to engage the side surface of the other wheel;
   g. each slot having a width corresponding to but slightly greater than the thickness of said circular disc to allow for rotation of said disc in said slot;
   h. retaining means for retaining said discs in said slots;
   i. and means for moving the position of said one of said wheels along its axis to change the positions of said wheels with respect to each other while maintaining their right angle relationship.

2. A variable speed drive according to claim 1 characterized in that:
   a. said disc-retaining means comprise annular retaining bands secured to opposite faces of said one wheel at the periphery thereof, said retaining bands having surfaces curving inwardly to correspond to the curvature of the edges of said discs.

* * * * *